United States Patent

[11] 3,571,596

[72] Inventors Richard B. Frank
 Deerfield;
 George J. Hanz, Bloomingdale, Ill.
[21] Appl. No. 789,907
[22] Filed Jan. 8, 1969
[45] Patented Mar. 23, 1971
[73] Assignee Nuclear-Chicago Corporation
 Des Plaines, Ill.

[54] PROGRAMMING APPARATUS FOR AN AUTOMATIC LIQUID SCINTILLATION COUNTING SYSTEM
 5 Claims, 13 Drawing Figs.
[52] U.S. Cl. .................................................. 250/106,
 250/219, 250/223
[51] Int. Cl. ..................................................... G21h 5/00,
 G01n 21/30, G06m 7/00
[50] Field of Search............................................ 250/106
 (S.C.), 219 (IDD), 223

[56] References Cited
 UNITED STATES PATENTS
 3,246,156 4/1966 Frank et al.................. 250/106

*Primary Examiner*—Archie R. Borchelt
*Assistant Examiner*—T. N. Grigsby
*Attorneys*—Lowell C. Bergstedt, Walter C. Ramm and Helmuth A. Wegner ABSTRACT: Sample group programming apparatus comprising a program indicating plug mounted on a sample conveyor and reading apparatus adjacent the conveyor. The program indicating plug includes a support member carrying a vertically disposed optical structure, and a code cylinder rotatably mounted thereon. Five circumferential rows of apertures exist on the code cylinder, one for admitting light to the optical structure and four for providing 16 separate binary coded vertical arrays. The reading apparatus comprises a light source and four light responsive elements appropriately mounted on a support structure adjacent the conveyor to read the operative array of apertures on a plug in a reading position.

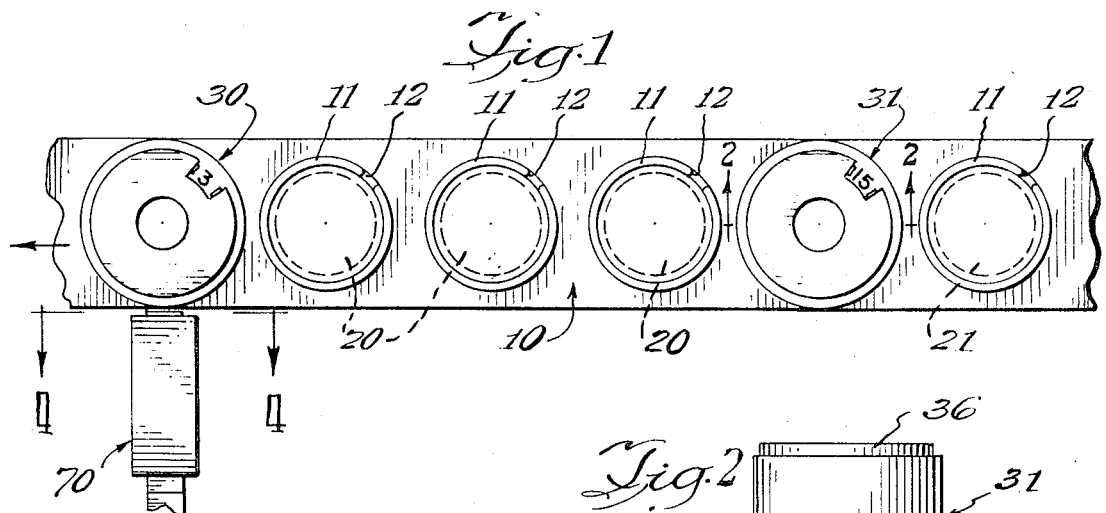
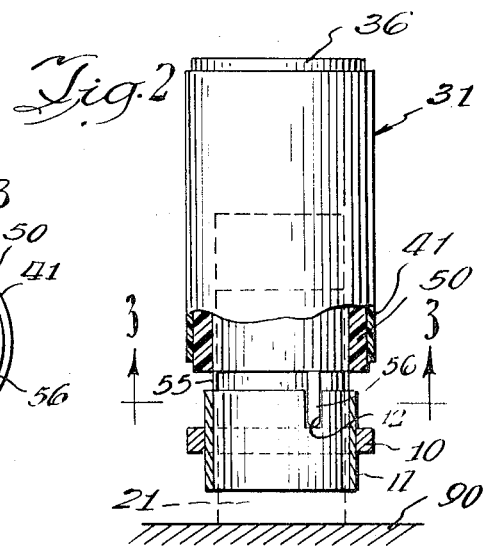
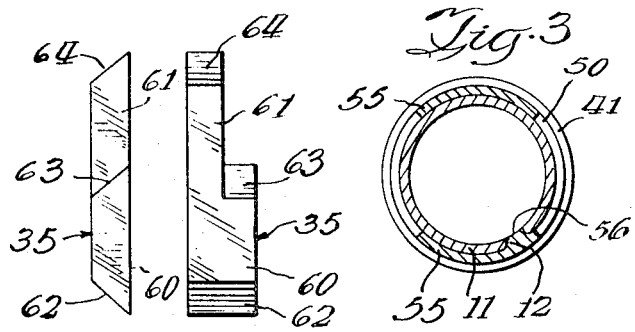
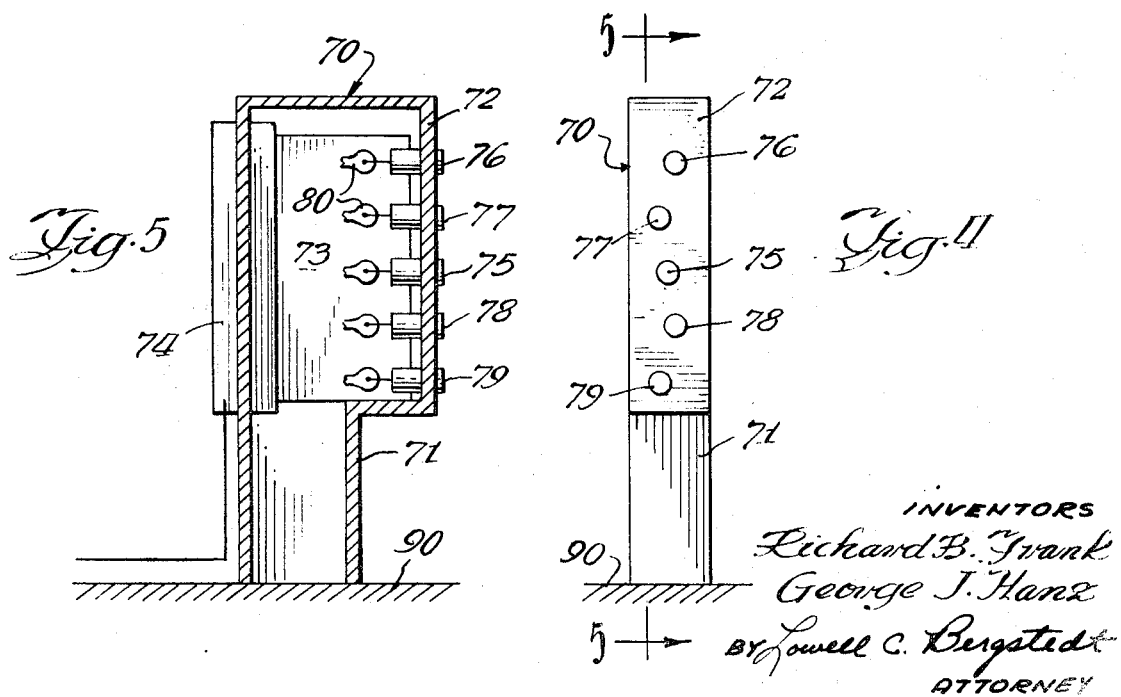

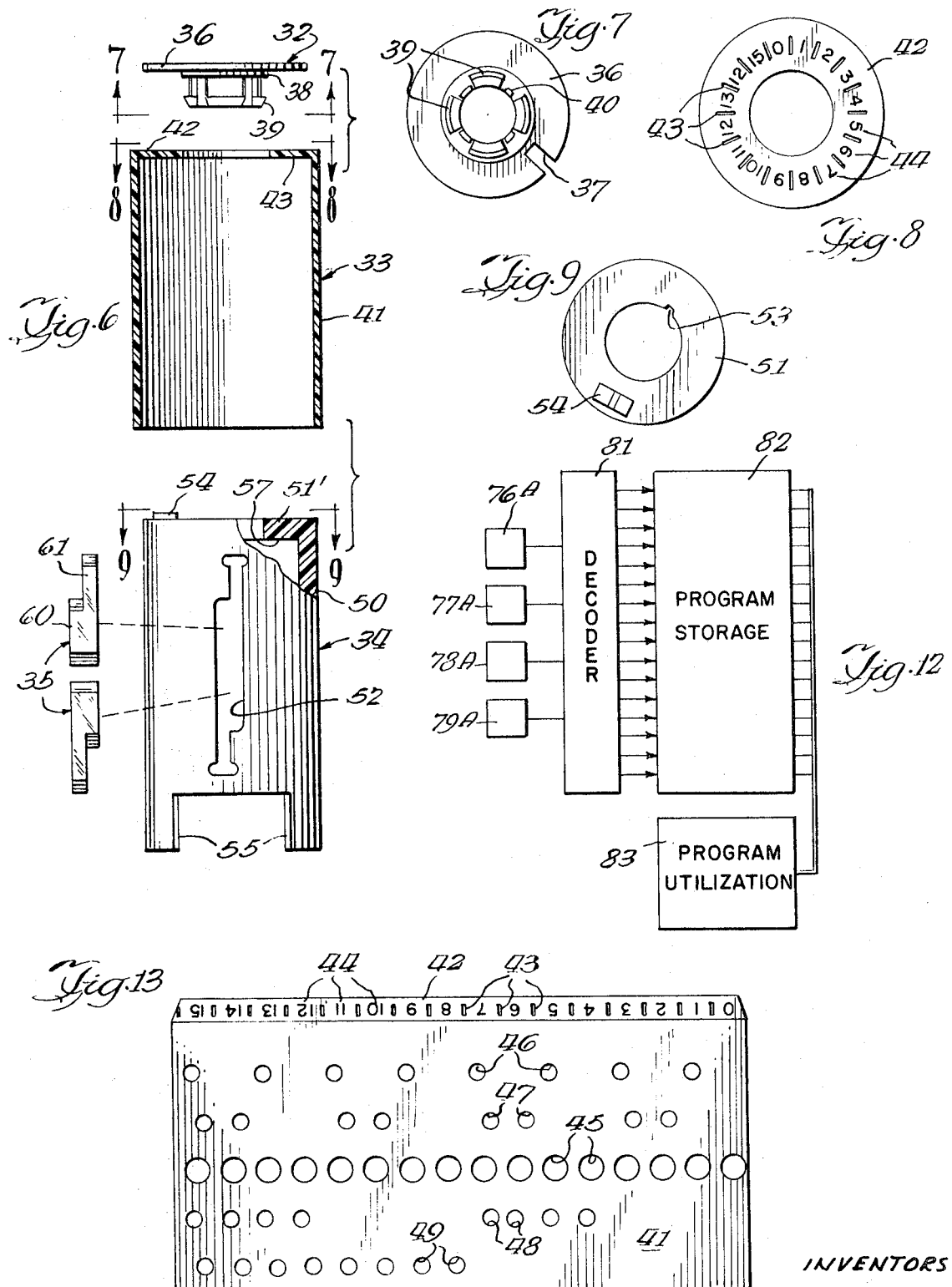

PROGRAMMING APPARATUS FOR AN AUTOMATIC LIQUID SCINTILLATION COUNTING SYSTEM

The need for programming apparatus for an automatic liquid scintillation counting system is discussed in detail in a copending patent application of Richard B. Frank, Ser. No. 789,791, dated Jan. 8, 1969.

It is the object of this invention to provide an improved sample group programming apparatus for an automatic liquid scintillation counting system.

It is another object of this invention to provide sample group programming apparatus which has a capacity for a large number of liquid scintillation counting programs.

The sample group programming apparatus of this invention is designed for use in an automatic liquid scintillation counting system which includes a sample transfer station, apparatus for conveying a plurality of liquid scintillation samples to the transfer station (such as the conveyor system shown in Meeder et al. U.S. Pat. No. 3,206,006), a sample counting station, apparatus for transferring samples between the sample transfer station and the sample counting station (such as the apparatus shown in Meeder et al. U.S. Pat. No. 3,163,756), and apparatus for counting samples at the counting station in accordance with numbered counting programs stored therein. In accordance with a preferred embodiment of this invention, the sample group programming apparatus includes indicating apparatus comprised generally of a hollow cylindrical support member adapted to be mounted in a fixed orientation on the conveying apparatus over a first-to-be-counted sample, a hollow code cylinder rotatably mounted on the support member, and an optical structure mounted in the support member behind the code cylinder. The code cylinder is substantially opaque and defines a plurality of rows of circumferentially disposed apertures through its walls with the apertures arranged in vertical arrays to define a plurality of binary coded decimal numbers. The optical structure behind the code cylinder is vertically disposed for communicating light impinging on the support member at one location to other locations corresponding to apertures in one of the vertical arrays on the code cylinder. The code cylinder is rotatably mounted so that any of the vertical arrays of apertures may be positioned in operative relation to the optical structure.

The programming apparatus of this invention also includes reading apparatus comprised essentially of a vertically disposed support structure mounted in a reading location relative to the sample transfer station with a light source mounted on the support structure for communicating a beam of light to the optical structure on the indicating apparatus arriving at the reading location and a plurality of light responsive elements mounted in a vertical array in positions corresponding to the positions of apertures on the indicating apparatus. The light responsive elements thus detect the presence or absence of apertures in a particular vertical array by the presence or absence of light impinging on these elements, and the outputs of these elements may be decoded for signalling a program number to the counting apparatus.

The vertical disposition of the groups of coded apertures in the code cylinder and the vertical disposition of the reading apparatus permit the utilization of a four digit binary code which can select up to 16 different counting programs. This large programming capability is particularly useful in a counting system for which multiple user applications are likely.

Other objects, features and advantages of this invention will be apparent from a consideration of the following detailed description in conjunction with the accompanying drawings in which:

FIG. 1 is a partly schematic drawing of programming apparatus in accordance with this invention;

FIG. 2 is a partly sectioned elevational view taken along the lines 2—2 in FIG. 1;

FIG. 3 is a section view taken along the lines 3—3 in FIG. 2;

FIG. 4 is a view of reading apparatus in accordance with this invention taken along the lines 4—4 in FIG. 1;

FIG. 5 is a partly sectioned elevational view of reading apparatus taken along the lines 5—5 in FIG. 4;

FIG. 6 is a partly sectioned exploded assembly diagram of a program indicating plug in accordance with this invention;

FIGS. 7 through 9 are views of portions of the indicating plug shown in FIG. 6 taken along the respective lines 7—7, 8—8 and 9—9;

FIGS. 10 and 11 are side and rear views of one of the elements shown in FIG. 6;

FIG. 12 is a block schematic diagram illustrating the output utilization of the sample group programming apparatus of this invention; and FIG. 13 is a schematic diagram of the layout of apertures of one of the elements in FIG. 6.

In FIG. 1 a conveyor 10 is shown carrying a first program indicating plug 30 and a second program indicating plug 31. Program indicating plug 30 is shown in a reading position relative to reading apparatus 70. As shown, conveyor 10 includes a plurality of sample holding receptacles 11 each having a slot or keyway 12 therein. Program indicating plug 30 is associated with a first group of liquid scintillation samples 20 (shown in dotted lines) while program indicating plug 31 is associated with a second group of liquid scintillation samples designated 21. As shown in FIG. 2 program indicating plug 31 (and similarly program indicating plug 30) is mounted on conveyor 10 over a sample receptacle 11 and a liquid scintillation sample 21. A key 56 on program indicating plug 31 mates with keyway 12 on sample receptacle 11 to lock program indicating plug 31 in a proper orientation on conveyor 10. The construction of program indicating plugs 30 and 31 will be described in conjunction with various of the FIGS. in the drawing.

The main elements of a program indicating plug in accordance with a preferred embodiment of this invention are a hollow cylindrical support member 34, a hollow code cylinder 33, a capping element 32 (all of which may be constructed of nylon) and optical elements 35 (which may be glass). As can best be seen in FIGS. 2, 3 and 6, support member 34 includes a pair of leg portions 55 which mount over a sample receptacle 11. The sidewalls 50 of support member 34 surround and extend above a liquid scintillation sample 21 carried in receptacle 11. In an external portion of cylindrical sidewall 50, an appropriately shaped groove 52 is defined for the inserting of optical elements 35. On top portion 51 of support element 34 a detent spring 54 is mounted. As best shown in FIGS. 8 and 9, detent spring 54 cooperates with slotted apertures 43 in a top portion 42 of code cylinder 33 to provide detented indexing of code cylinder 33 as it rotates on support member 34.

Code cylinder 33, which is preferably light opaque, comprises essentially a cylindrical wall portion 41 having a plurality of circumferentially disposed rows of apertures therein, as shown in FIG. 13, and a top portion 42 having a plurality of decimal or other indicia 44 thereon in addition to apertures 43. The cylindrical wall portion 41 mounts over the support member 34 after optical elements 35 have been mounted in slot 52.

Capping element 32 comprises essentially a substantially flat top 36 having a window 37 therein, a shoulder portion 38, a plurality of finger portions 39 and a key portion 40. Capping element 32 functions to secure code cylinder 33 to support member 34 in a rotatable fashion. Shoulder portion 38 has a thickness substantially equal to the thickness of top portion 42 of code cylinder 33 and a diameter slightly greater than the open aperture in top portion 41 of support member 50. Finger portions 39 grip underside 57 of support member 34 with key portion 40 cooperating with a keyway 53 in support member 34 to lock capping element 32 in a fixed position relative to support member 34. The overall result is that code cylinder 33 is rotatable to indexed positions while capping element 32 and support member 34 are locked together. Of course, code cylinder 33 secures optical elements 35 in their places within slot 52.

The structure of optical element 35 is best shown in FIGS. 10 and 11. Each of the optical elements 35 comprises a long trapezoidal portion 61 and a short trapezoidal portion 60. Portions 60 and 61 may be integral with each other as shown or separate pieces. End portions 62, 63 and 64 are oriented at 45° angles to the front of element 35. Light entering optical element 35 at its lower extremity will be reflected by sidewall 62 toward sidewalls 63 and 64 where portions will be reflected back out of the optical element. Referring to FIG. 13 in conjunction with FIG. 6, it will be apparent each optical element will direct light entering a central aperture 45 to appropriate code apertures 46, 47, 48 and 49 if such apertures are present in a particular vertical array. Which apertures are present, in turn, is dependent upon the position of code cylinder 33 on support member 34. The angled end portions 62, 63 and 64 of optical elements 35 may be at least partly silvered to enhance their reflecting capability.

In FIGS. 4 and 5 a portion of the structural details of reading apparatus 70 are shown. Reading apparatus 70 consists essentially of a vertical support member 71 having mounted in a front surface 72 a centrally disposed light source 75 and four vertically arrayed light responsive elements 76, 77, 78 and 79. Light source 75 may be, for example, a simple incandescent light bulb, and light responsive elements 76—79 may be photodiodes, phototransistors, or photoresistors. The respective heights of elements 75 through 79 above table 90 must be such as to provide for aligning of light source 75 with light admitting apertures 45 on a particular program indicating plug and for light responsive elements 76—79 correspondingly mating with apertures 46—49 on code cylinder 33. Light source 75 and light responsive elements 76—79 may be connected to printed conductors 80 on a printed circuit card 73 to provide appropriate electrical connection to these respective elements. Other circuit elements providing for appropriate detecting functions connected with light responsive elements 76—79 may also be provided on printed circuit card 73. A printed circuit card connecter 74 is shown providing electrical connection to printed circuit card 73. The details of electrical connections of light source 75 and light responsive elements 76—79 are not show since various types of appropriate operating circuitry are well known to those familiar with this art.

Light source 75 and light responsive elements 76—79 may be continuously energized to detect and read program indicating plugs passing in front of reading apparatus 70 by appropriate discrimination between scattered light levels with no plug in a reading position and light levels obtained by directing light from source 75 through optical elements 35 and through appropriate apertures back into light responsive elements 76—79 when a plug is in a reading position. The manner of providing this discriminating function is familiar to those skilled in the art and thus is not shown. On the other hand, a switch could be provided in connection with reading apparatus 70 to detect the presence of a program indicating plug in a reading position and to turn on the electrical elements associated with reading apparatus 70 only when a program indicating plug is present.

As shown in FIG. 12 the four binary digit outputs of reading apparatus 70 are designated as associated with circuitry in blocks 76A through 79A may be decoded by a binary to decimal decoder 81 to provide a signal on one of 16 leads into program storage apparatus 82. Depending on which of the 16 input leads to program storage apparatus 82 is signalled, an appropriate program is supplied to program utilization apparatus 83. The various types of program storage that might be used in conjunction with a liquid scintillation counting system are described in the above mentioned copending application of Richard B. Frank.

The positioning of reading apparatus 70 relative to the sample transfer station of a liquid scintillation counting system is flexible. Thus reading apparatus may be located directly at the sample transfer station or at a sample position immediately preceding the sample transfer station or at any other location if proper memory facility is provided.

Each of the decimal numbers or other indicia on the top of code cylinder 33 corresponds to a particular program and to a particular vertical array of code apertures. If decimal number indicia are utilized there is no requirement that a particular number be associated with its binary coded equivalent on code cylinder 33. Window 37 permits the viewing of one of the indicia 44 on top 42 of code cylinder 33 corresponding to one of the vertical arrays of code apertures thereon, and correspondence among that one of the indicia 44, the vertical aperture array in position over optical elements 35, and an associated program appropriately designated must of course be maintained.

The above description of this invention is given by way of example only and it should be understood that many modifications can be made therein without departing from the scope of this invention as claimed in the following claims:

We claim:

1. In an automatic liquid scintillation counting system which includes:
    a sample transfer station;
    apparatus for conveying a plurality of liquid scintillation samples to said transfer station;
    a sample counting station;
    apparatus for transferring samples between said stations; and
    apparatus for counting samples at said counting station in accordance with one of up to $2^n$ numbered counting programs stored therein, where $n$ is an integer greater than 2;
    improved sample group programming apparatus comprising:
        an indicating apparatus including a hollow, generally cylindrical support member adapted to be mounted in a fixed orientation on said conveying apparatus over a first-to-be-counted sample in a group thereof; a hollow code cylinder rotatably mounted on said support member, said code cylinder being substantially light opaque and defining $n$ rows of circumferentially disposed code apertures through the walls thereof, said apertures being arranged in vertical arrays to define $2^n$ binary coded decimal numbers in the sequence from 0 to $2^n-1$; a vertically disposed optical structure mounted in said support member for communicating light impinging upon said member at one location to other locations corresponding to possible locations of apertures in each of said $n$ rows; and
        a reading apparatus including a vertically disposed support structure mounted in a reading location relative to said sample transfer station; a light source mounted on said support structure for communicating a beam of light to said optical structure when said indicating apparatus arrives at said reading location, and $n$ light-responsive elements mounted in a vertical array on said support structure in positions corresponding to said $n$ rows of apertures to detect the presence or absence of apertures in accordance with the presence or absence of light impinging on said elements, whereby the signals from said photoresponsive elements may be decoded for signalling to said counting apparatus a corresponding one of said $2^n$ counting programs.

2. Apparatus as claimed in claim 1, wherein $n$ is four, said code cylinder having a central circumferential row of light admitting apertures, and said four rows of code apertures are disposed two above and two below said central row, and said optical structure comprises first and second light conducting elements each communicating a portion of light admitted through one of said light admitting apertures to apertures in said rows above and below said central row.

3. Apparatus as claimed in claim 2, wherein code apertures in rows adjacent said light admitting apertures are oppositely staggered from vertical center lines through said light admitting apertures and said code apertures in nonadjacent rows are staggered in a reverse manner; and each of said light conducting elements comprises two regular trapezoidal portions of light conducting material having end angles of substantially 45° with at least a thin layer of reflecting material on said ends, one of said portions being of a length to conduct light to apertures in an adjacent row and the other being of a length to conduct light to apertures in a nonadjacent row.

4. Apparatus as claimed in claim 1, wherein said code cylinder is mounted in an indexable fashion on said support member by a cooperative arrangement of a detent mounted on a partly closed top portion of said support member, radially disposed grooves in a partly closed top portion of said code cylinder, and a capping element having a top portion capping said top portion of said code cylinder and a plurality of deformable finger portions reaching through openings in said tops of said support member and said code cylinder and grasping the underside of said top portion of said support member.

5. Apparatus as claimed in claim 4, wherein said capping element has a key portion cooperating with a groove in said support member to lock said capping element and said support member together, said partly closed top portion of said code wheel has $2^n-1$ indicia arranged thereon, and said top portion of said capping element has a window therein to reveal an appropriate one of said indicia corresponding to the binary coded number to be indicated by said indicating apparatus.